Aug. 27, 1929.   W. LA. VIGNA ET AL   1,725,806
END BRACKET FOR DYNAMO ELECTRIC MACHINES
Filed July 29, 1927
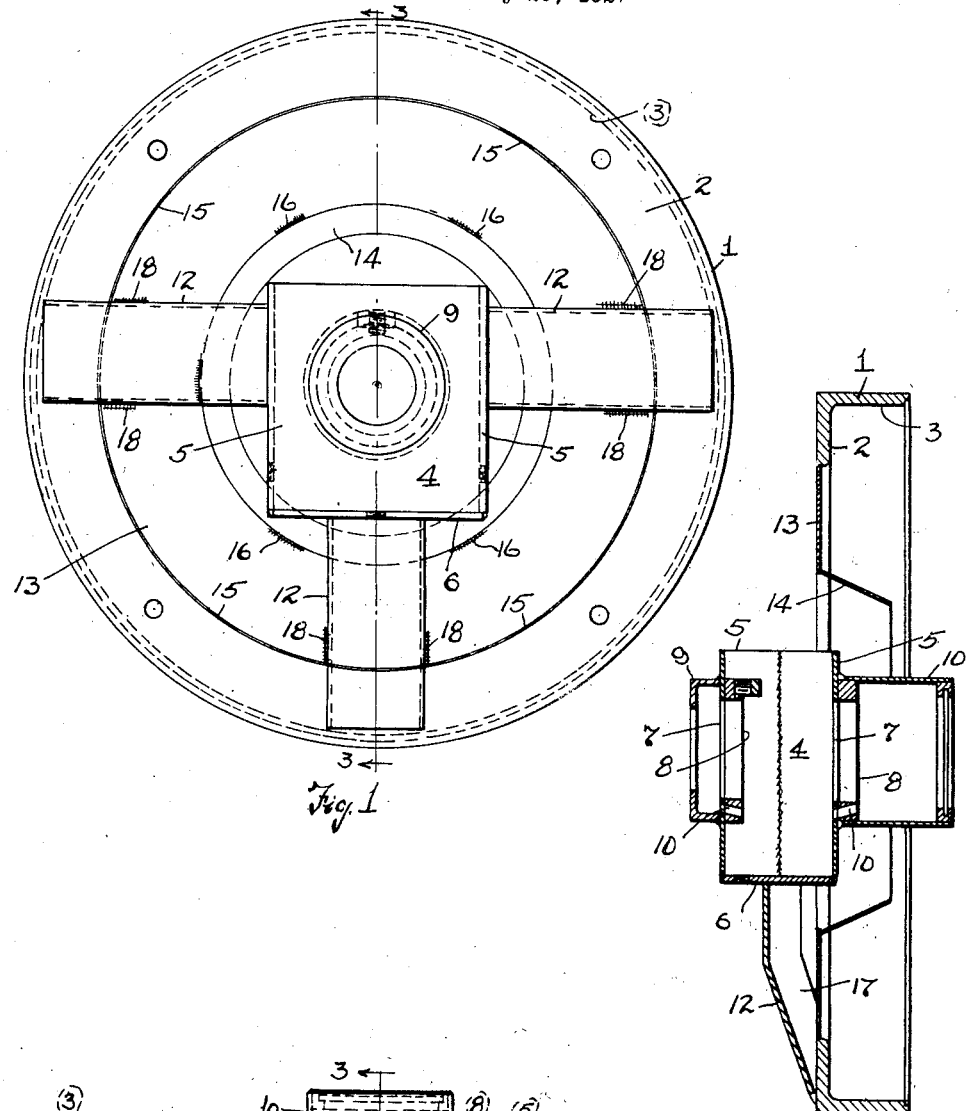
INVENTORS
William LaVigna and
BY Frank Malner
Fay, Oberlin & Fay
ATTORNEYS.

Patented Aug. 27, 1929.

1,725,806

UNITED STATES PATENT OFFICE.

WILLIAM LA VIGNA, OF UNIVERSITY HEIGHTS, AND FRANK MALNER, OF CLEVELAND, OHIO, ASSIGNORS TO THE LINCOLN ELECTRIC COMPANY, OF CLEVELAND, OHIO, A CORPORATION OF OHIO.

END BRACKET FOR DYNAMO-ELECTRIC MACHINES.

Application filed July 29, 1927. Serial No. 209,214.

In a co-pending application of William La Vigna, one of the applicants herein, filed June 23, 1927, Serial No. 200,842, a novel construction of end bracket for dynamo electric machines is disclosed and claimed, such construction being characterized by the substitution for the cast iron bracket, heretofore customarily employed in this connection, of a bracket fabricated out of structural steel shapes. Specifically such improved bracket comprises a central cylindrical steel portion that forms the bearing box for the shaft or spindle of the machine, a bracket ring of structural steel stock made from an elongated structural steel member formed into a circle and having its ends welded together, and buttress-legs welded to such box and bracket ring.

The present improvements relate more particularly to a fabricated end bracket of the type in question in which the bearing box is likewise assembled from structural steel members. Still more particularly the present improvements relate to an end bracket with a bearing box adapted to receive a so-called solid bearing. Incidentally certain modifications in the structure of the end bracket itself are involved.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a front elevation of our present improved end bracket and bearing box; Fig. 2 is a top plan view thereof; and Fig. 3 is a central vertical section taken on the plane indicated by the line 3—3, Figs. 1 and 2 respectively.

The principal element or base of the end bracket is a ring 1 of angular cross-section, as best shown in Fig. 3. This ring, as more fully described in the aforesaid co-pending application, is formed of structural steel stock, specifically from angle bar stock, a length thereof being cut and beveled at the ends so that upon bending the piece into circular form and bringing the ends together in abutment, a ring shaped piece is had. The seam at the abutting ends is then completed by welding, as for example by an arc pencil or a carbon arc into which a pencil of welding metal is introduced. The resulting ring presents the form of a centrally directed flange 2 and a peripheral cylindrical portion 3.

The bearing box, which is located approximately centrally with respect to said ring 1, comprises a main portion 4 that is of general rectangular form. The side walls of this portion are formed of two pieces 5 of channel iron cut to the proper length, brought together with the edges of the flanges in abutting relation, and the seams along such edges completed by welding just as in the case of the ends of the piece of angle bar employed in making the ring 1. The bottom of such portion 4 is formed of a separate rectangular plate 6 of proper dimensions that is in turn welded to the corresponding end of the open rectangular box formed of the channel parts 5, as just described. The latter have aligned openings 7 formed in their respective flat faces and welded to such faces concentric with these openings are the bearing rings 8 in which the shaft is journaled. Cylindrical shell-like housings 9 and 10 are also welded to such faces to provide holders for the necessary packing rings or equivalent means whereby escape of lubricant from the box is prevented.

It will be noted that the openings 7 that determine the location of the shaft axis are central with respect to the ring 1, but that such openings are not central with respect to the main portion 4 of the box, the latter lying slightly below a transverse diametral line. The bottom of portion 4 of the bearing box accordingly is adapted to serve as a receptacle for the oil or other lubricant and each bearing ring 8 is desirably provided in its lowermost portion with a drain opening 10, so that oil from the housings 9 and 10 may run back into such receptacle. The buttress-legs 12, three in number, will preferably be made from structural steel, cut to shape and formed if necessary, their respective ends being formed to interfit with the ring 1 and with the main portion 4 of the bearing box and being welded to the respective parts to form a rigid structure of the whole.

The end bracket may also be provided with a deflector in order to direct the current of air drawn through the motor for cooling purposes. As shown, such deflector comprises two plates 13 and 14, the first of which is in the shape of an annulus fitted closely within the flange portion 2 of ring 1 and welded thereto at circumferentially spaced points 15, while the second plate 14 is of frusto-conical form fitted in turn within the central opening in plate 13 and welded thereto at circumferentially spaced points 16. In order to give additional rigidity to the deflector structure, the buttress-legs 12 are preferably made of channel section and the side flanges 17 thereof are beveled off at the outer ends of such legs so as to overlap the annular plate 13 and the two parts are then welded together at the points 18 in question.

The buttress-legs 12 are preferably spaced as shown, i. e., two are disposed in a transverse diametral plane, the other depending downwardly so as to give free access to the upper portion of the bearing box. A removable cover will desirably be provided for the latter.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In an end-bracket for a dynamo-electric or like machine, the combination of a ring member made from structural steel, a bearing box, and buttress legs welded at their respective ends to said ring member and box, the latter being made of pieces of structural steel welded together.

2. In an end-bracket for a dynamo-electric or like machine, the combination of a ring member made from structural steel, a bearing box, the buttress legs welded at their respective ends to said ring member and box, the latter being made of approximately rectangular pieces of structural steel welded together.

3. In an end-bracket for a dynamo-electric or like machine, the combination of a ring member made from structural steel, a bearing box, and buttress legs welded at their respective ends to said ring member and box, the latter being made of approximately rectangular pieces of angular steel stock and a bottom plate, all likewise welded together.

4. In an end-bracket for a dynamo-electric or like machine, the combination of a ring member made from structural steel, a bearing box, and buttress legs welded at their respective ends to said ring member and box, the latter being made of approximately rectangular pieces of steel channel stock with their flanges in abutting relation and a bottom plate, all likewise welded together.

5. In an end-bracket for a dynamo-electric or like machine, the combination of a ring member made from structural steel, a bearing box, and buttress legs welded at their respective ends to said ring member and box, the latter being made of approximately rectangular pieces of steel channel stock with their flanges in abutting relation and a bottom plate, all likewise welded together, such pieces having aligned openings for the shaft to be journalled in said box.

6. In an end-bracket for a dynamo-electric or like machine, the combination of a ring member made from structural steel, a bearing box, and buttress legs welded at their respective ends to said ring member and box, the latter being made of approximately rectangular pieces of steel channel stock with their flanges in abutting relation and a bottom plate, all likewise welded together, such pieces having aligned openings for the shaft to be journalled in said box.

Signed by us this 25th day of July, 1927.

WILLIAM LA VIGNA.
FRANK MALNER.